Sept. 24, 1963 TETSURO TANAKA ET AL 3,105,208

MECHANICAL FILTER

Filed Aug. 28, 1958

Tetsuro Tanaka
Shigeru Miura
INVENTORS

BY Wenderoth, Lind and Ponack ATTORNEYS

3,105,208
MECHANICAL FILTER

Tetsuro Tanaka, Kitashirakawa, Sakyo-ku, Kyoto, and Shigeru Miura, Syogoin, Sakyo-ku, Kyoto, Japan, assignors to Murata Manufacturing Co., Ltd., Kyoto, Japan, a corporation of Japan Filed Aug. 28, 1958, Ser. No. 758,650
Claims priority, application Japan Sept. 3, 1957
2 Claims. (Cl. 333—71)

This invention relates to electrical mechanical wave filters and more particularly to wave filters using spherical members as mechanical resonators.

In the commonly used electrical mechanical wave filters, rectangular plates, circular cylinders, or circular discs have been used as mechanical resonators. These mechanical resonators have shapes such that they can be described in terms of two or three dimension parameters and can vibrate in several different modes such as longitudinal, bending, shearing, radial or torsional. Also they have many different fundamental tuning frequencies which are determined both by their size and shape and their modes of vibration. Moreover if one dimension is disproportionately large or small compared to the others, the overtone frequencies of some vibration modes become comparable in magnitude to the fundamental frequencies of other modes and interfere with each other. In such circumstances spurious vibrations occur and adversely affect the filter response. An additional problem is that a high degree of mechanical precision of the many sizes of the mechanical resonator is necessary and leads to high machining costs.

Accordingly, an object of this invention is to provide an improved electrical mechanical wave filter which is free from the difficulties due to spurious vibrations.

Another object of this invention is to provide a simple and low cost electrical mechanical wave filter.

The novel features of the invention, as well as the invention itself, both as to its organization and method of operation, will be apparent from the following description and from the drawing, which is intended for the purpose of illustration only, and in which.

A ball has only one dimension and has three modes of vibration namely, torsional (rotational), radial (changing volume), and spheroidal (changing shape). And therefore it has a fundamental frequency which is determined by the radius of the ball and the physical properties of its material for each of the three vibration modes mentioned above. These fundamental frequencies are given by the following equations in "The Mathematical Theory of Elasticity" by A. E. H. Love.

$$f_t=\frac{1.834}{2a}\sqrt{\frac{E}{Q}\cdot\frac{1}{2(1+\sigma)}} \text{ for torsional vibration}$$

$$f_v=\frac{0.816}{2a}\sqrt{\frac{E}{Q}\cdot\frac{(1-\sigma)}{(1+\sigma)(1-2\sigma)}} \text{ for radial vibration}$$

$$f_s=\frac{0.84}{2a}\sqrt{\frac{E}{Q}\cdot\frac{1}{2(1+\sigma)}} \text{ for spheroidal vibration}$$

where $a$ is the radius of the ball, $\sigma$ is Poisson's ratio, E is Young's modulus and Q is the density of the ball material. The fundamental frequencies are mutually separated, numerically in the proportions 2.2:1.7:1, and are therefore sufficiently different so that the ball will be free from the difficulty due to spurious vibrations.

Figure 1:
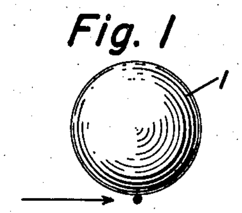
FIG. 1, shows a ball shape resonator, which vibrates in a certain mode.

FIG. 1 shows schematically the mode of spheroidal vibration of a ball resonator which is caused by an external force acting axially at a point on the spherical surface of the ball as shown by the arrow and is in ($d$) the states of rest, ($e$) as a spheroid with a short main axis, and ($f$) as a spheroid with a long main axis. In practice, in order that the filters be compact, the mode of spheroidal vibration is usually selected, and for the intermediate frequency of 455 kc./s., the diameter of the ball, $2a$, becomes about 6 mm. when using steel, and its weight is about 0.93 gr.

Figure 2:
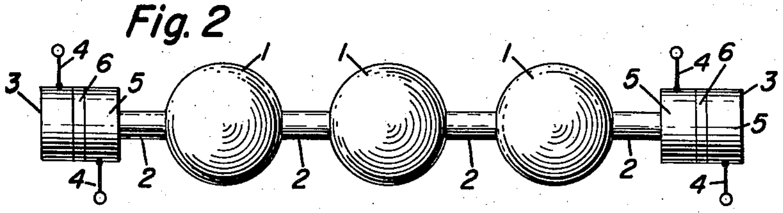
FIG. 2 is a schematic representation of one embodiment of this invention.

FIG. 2 shows one embodiment of this invention, which consists of three ball shape resonators 1, connected together by couplers 2, and also with electro-mechanical transducers 3 in both ends. With an increased number of ball shape resonators, a better attenuation characteristic is gained as in the usual type of mechanical filter.

The pass band width ratio B is given by the following equation, $$B=\frac{D_2^2 Q_2 C_2}{2m_1 W}$$

where $D_2$, $Q_2$, and $C_2$, are the diameter, density, and sound propagation velocity of the coupler 2 respectively, and $m_1$ is the effective mass of the ball resonator, W is the angular value of the frequency $f_s$ selected. The ratio of the effective mass of ball resonator $m$, to the total mass of ball is different for each vibration made and was experimentally determined to be about 0.4 for the mode of spheroidal vibration. And thus for an intermediate frequency of 455 kc./s. and a pass band width of 10 kc./s., the diameter of the steel couplers 2 comes to about 0.6 mm. Also the length of the steel couplers is about 3 mm., equivalent to one quarter wavelength at 455 kc./s.

Figure 4:
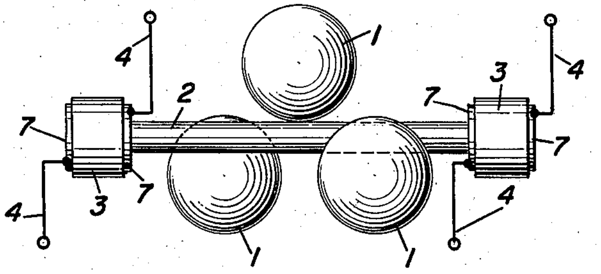
FIG. 4 is a schematic representation of still another modification.

The electro-mechanical transducers, are shown in FIG. 4, using $BaTiO_3$ group ceramic vibrators, whose mass is equal to $m$, the effective mass of the ball resonators, so as to match the mechanical impedance of the transducers with that of the resonators.

The mechanical filter constructed in the manner described above, using three section of ball resonators gives the characteristic,

| | |
|---|---|
| Ripple in pass band | below 3 db. |
| Attenuation steepness | 15 db/kc./s. |
| Spurious resonance | below −15 db. |

for an intermediate frequency of 455 kc./s., and 6–20 kc./s. pass band width.

The transducers illustrated in FIG. 2, are the so-called Langevin type vibrators, which consist of a ceramic piezo-electric disc 6 rigidly sandwiched between two metal discs 5 and to these metal discs electrical lead wires 4 are soldered. But other shapes and types of transducers can also be used effectively, as illustrated in the other embodiments, and also magnetostrictive transducers may be used in place of the piezoelectric.

Figure 3:
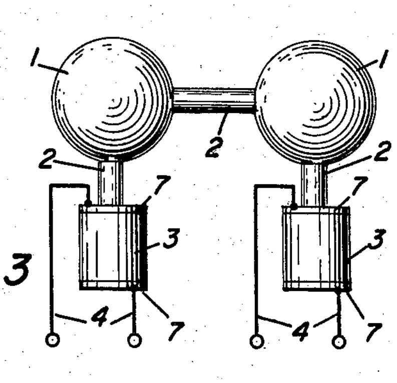
FIG. 3 is a schematic representation of a modification.

FIG. 3 is an example showing the resonators and transducers in a rectangular arrangement, making it possible to reduce the overall dimensions as desired.

The transducers in the figure are ceramic piezo-electric discs to whose end face silver electrodes 7 are fired on, and it is to these electrodes that the electrical lead wires 4 are soldered.

FIG. 4 shows an example of mechanical filters whose resonators are excited in a torsional vibration mode. In this vibration mode, the radius of the resonator becomes comparatively large, and so it is suitable for use at higher frequencies when the other modes of vibration require resonators which are so small that they are difficult to machine and fabricate with precision.

In the figure the transducer drives the coupler rod in a longitudinal direction, and in turn the coupler drives the resonators in a torsional vibration mode.

Figure 5:
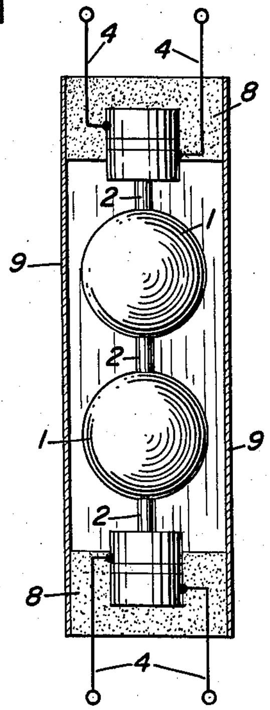
FIG. 5 is a schematic representation of a cross-sectional view of an embodiment of this invention showing the method of mounting.

FIG. 5 shows the mounting method for such mechanical filters, in which a mechanical filter with two spherical resonators is supported by spongy cushions 8 at both ends, namely, on transducer parts, and the whole is contained in an insulator tube, which is to be mounted on a suitable base or assembled together with other parts such as a matching transformer, etc.

The spongy cushion method of support was adopted for the reason that there is no proper position for support in the case of fundamental resonance because the surfaces of such transducers have such a large amplitude everywhere on the plane and curved surface. In such an arrangement, the filter constructed for 455 kc./s. intermediate frequency has an attenuation response of 28 db by off-tuning from the center frequency by ± 10 kc./s.

Figure 6:
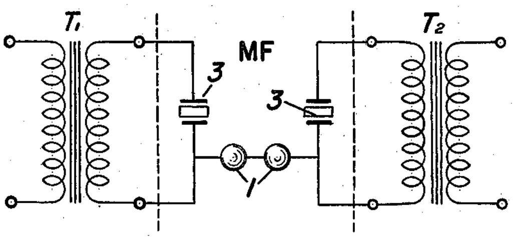
FIG. 6 is a schematic diagram showing a mechanical filter in accordance with this invention used in the intervalve stage of a broadcast receiver.

FIG. 6 shows a schematic diagram for using the mechanical filter designed by this invention in the inter-valve stage of a broadcast receiver. In the FIGURE T1 denotes an input matching transformer, T2, an output matching transformer, and MF the mechanical filter.

The most important feature of this invention is that it is possible to make a mechanical filter which is inexpensive enough to be used in most popular broadcast receivers. And this is possible because the ball has only one dimension and can be machined precisely enough by simple methods. This type of filter is particularly favored by the fact that the ball bearing industry produces enormous quantities of balls in various sizes and to great degrees of precision.

To maintain the advantage using an inexpensive ball, it is important to avoid necessitating any additional machining to the ball, such as drilling, or tapping, etc.

In order to assemble the mechanical tuning parts, namely, the ball resonators and the coupler rods, the most favorable method is welding, and this proved possible by using nickel coupler rods for steel balls.

Thus utilizing an inexpensive ball, and an arrangement and fabricating method, suitable for maintaining low cost, we are convinced that this invention will become a popular mechanical filter for use in common broadcast receivers.

We claim as our invention:

1. An electromechanical wave filter comprising a plurality of solid spherical resonators, a plurality of solid rod sections between said resonators and connecting them and extending past the end of said resonators, and two transducers to which the rod sections extending past the end of the resonators are respectively connected, the frequency of the passed wave being according to the formula $$f_s=\frac{0.84}{2a}\sqrt{\frac{E}{Q}\cdot\frac{1}{2(1+\sigma)}}$$

where $a$ is radius of the spherical resonators and the $\sigma$ Poisson's ratio, E the Young's modulus and Q the density of the material of the spherical resonators, and the width of the band passed being according to the formula $$B=\frac{D_2{}^2Q_2C_2}{2m_1W}$$

where B is the pass band width ratio, $D_2$ is the diameter of the rod sections, $Q_2$ is the density of the material of the rods and $C_2$ the sound velocity propagation constant, and $m_1$ is the effective mass of the resonators and W is the angular value of the frequency $f_s$.

2. An electromechanical wave filter as claimed in claim 1 in which said rod sections are aligned with each other and join said resonators radially thereof.

References Cited in the file of this patent

UNITED STATES PATENTS

| | | |
|---|---|---|
| 2,559,905 | Turner | July 10, 1951 |
| 2,605,354 | Burns | July 29, 1952 |
| 2,617,882 | Roberts | Nov. 11, 1952 |
| 2,619,604 | Burns | Nov. 25, 1952 |
| 2,631,193 | Roberts | Mar. 10, 1953 |
| 2,647,948 | Roberts et al. | Aug. 4, 1953 |
| 2,701,617 | Kock | Feb. 8, 1955 |
| 2,712,753 | Campbell | July 12, 1955 |
| 2,742,614 | Mason | Apr. 17, 1956 |
| 2,760,168 | Doelz et al. | Aug. 21 1956 |
| 2,810,888 | George et al. | Oct. 22, 1957 |
| 2,895,113 | Agar | July 14, 1959 |